(12) United States Patent
Weng et al.

(10) Patent No.: US 11,741,742 B2
(45) Date of Patent: Aug. 29, 2023

(54) DISPLAY APPARATUS WITH FINGERPRINT IDENTIFICATION FUNCTION

(71) Applicant: HON HAI PRECISION INDUSTRY CO., LTD., New Taipei (TW)

(72) Inventors: Yu-Fu Weng, New Taipei (TW); Hung-Yun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 50 days.

(21) Appl. No.: 17/355,603

(22) Filed: Jun. 23, 2021

(65) Prior Publication Data

US 2021/0319205 A1 Oct. 14, 2021

Related U.S. Application Data

(62) Division of application No. 16/664,322, filed on Oct. 25, 2019, now Pat. No. 11,093,728.

(30) Foreign Application Priority Data

Sep. 29, 2019 (CN) .......................... 201910934938.3

(51) Int. Cl.
*G06V 40/12* (2022.01)
*G06F 21/32* (2013.01)
*G06K 19/07* (2006.01)
*G06V 40/13* (2022.01)

(52) U.S. Cl.
CPC .......... *G06V 40/1365* (2022.01); *G06F 21/32* (2013.01); *G06K 19/0718* (2013.01); *G06V 40/1306* (2022.01)

(58) Field of Classification Search
CPC ...................... G06V 40/1365; G06V 40/1306; G06F 21/32; G06F 1/1643; G06F 1/1684; G06K 19/0718; H04M 1/026; H04M 1/0266

See application file for complete search history.

(56) References Cited

U.S. PATENT DOCUMENTS 10,614,283 B2 4/2020 He et al.
2015/0070301 A1 3/2015 Chia et al.
2017/0372110 A1* 12/2017 Uehara .................. G06F 3/041

FOREIGN PATENT DOCUMENTS

CN 207764813 U 8/2018
TW I665590 B 7/2019

* cited by examiner

*Primary Examiner* — John B Strege
(74) *Attorney, Agent, or Firm* — ScienBiziP, P.C.

(57) ABSTRACT

A display apparatus with fingerprint identification module within the display region of the display apparatus comprises a first cover and a display module, the fingerprint identification module being between the two. The first cover defines a display region and a non-display region. The fingerprint identification module includes a first substrate, a touch unit, a fingerprint identification unit, a control unit, and a first dummy unit with a plurality of first dummy electrodes. The first dummy unit is coplanar with the fingerprint identification unit. The first dummy electrodes surround the fingerprint identification unit, and cooperate with the fingerprint identification unit to enable uniform light transmittance over the whole display region.

6 Claims, 12 Drawing Sheets

DISPLAY APPARATUS WITH FINGERPRINT IDENTIFICATION FUNCTION

FIELD

The subject matter herein generally relates to security biometrics.

BACKGROUND

Fingerprint identification module has been used for security in protecting personal information. The fingerprint identification module is always an independent module in a display apparatus, separated from other elements. The fingerprint identification module is located in a non-display region, such as under a HOME key in a non-display region. During the development and fabrication processes of the display apparatus, it is very difficult to install the independent structure of the fingerprint identification module in a narrow bezel.

There is room for improvement in the art.

BRIEF DESCRIPTION OF THE FIGURES

Implementations of the present disclosure will be described, by way of embodiment, with reference to the figures.

DETAILED DESCRIPTION

Figure 1:
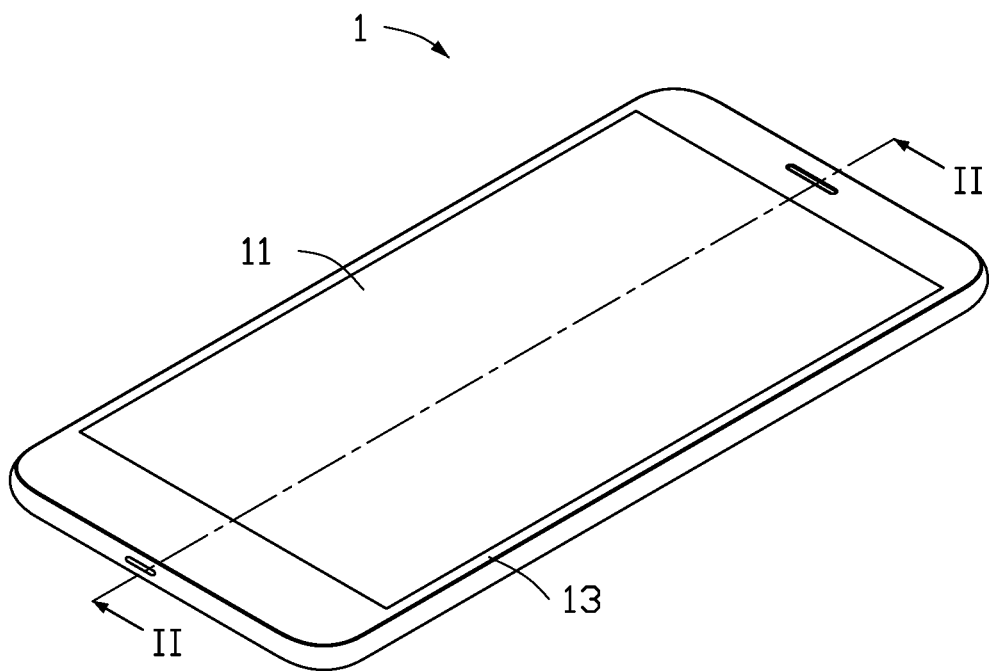
FIG. 1 is a schematic view of an embodiment of a display apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "substantially" is defined to be essentially conforming to the particular dimension, shape, or other feature that the term modifies, such that the component need not be exact. For example, "substantially cylindrical" means that the object resembles a cylinder but can have one or more deviations from a true cylinder. In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one." Embodiments of the present disclosure are described with reference to the drawings.

The present disclosure describes a display apparatus with fingerprint identification function, the fingerprint identification module is located in the display region and thus does not enlarge or insert a non-display region in the display apparatus.

FIG. 1 shows a display apparatus 1 with fingerprint identification function. The display apparatus 1 can be a display device with a fingerprint identification function, such as, mobile phone, tablet, or games machine. In other embodiments, the display apparatus 1 can be a display monitor with a fingerprint identification function. The display apparatus 1 is substantially a flat plate. The display apparatus 1 defines a display region 11 and a non-display region 13 surrounding the display region 11.

Figure 2:
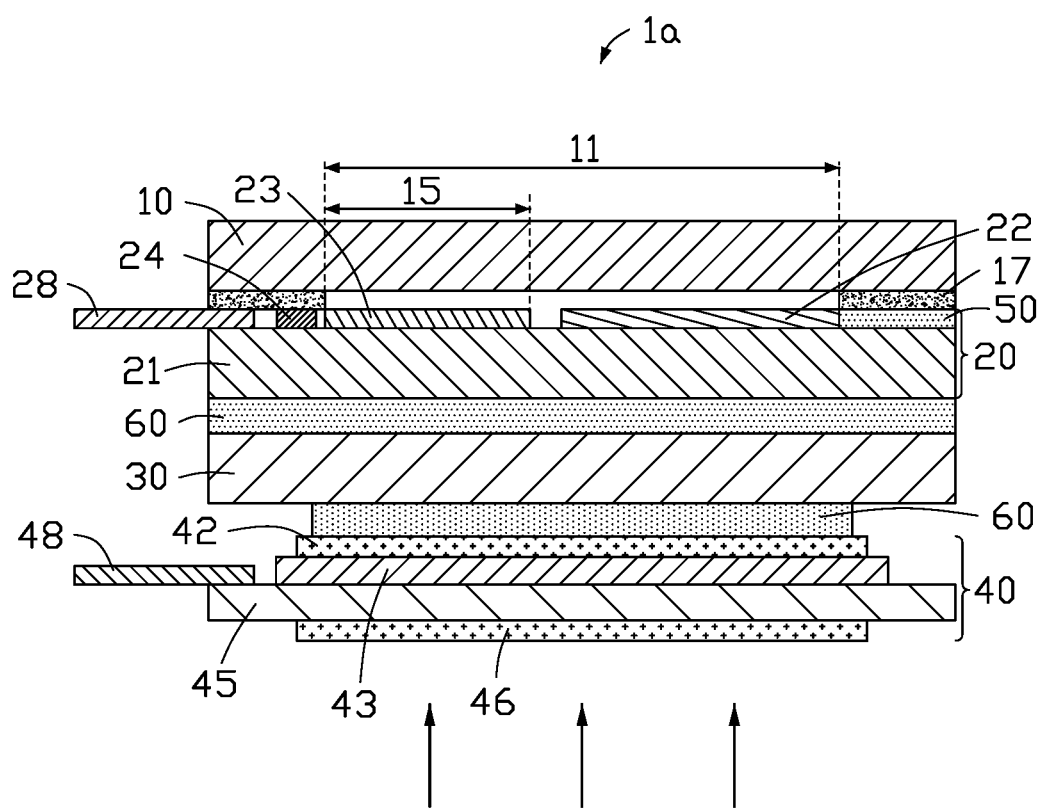
FIG. 2 is a cross-sectional view along line II-II of FIG. 1, a first embodiment of a fingerprint identification module being included in the display apparatus.
Figure 3:
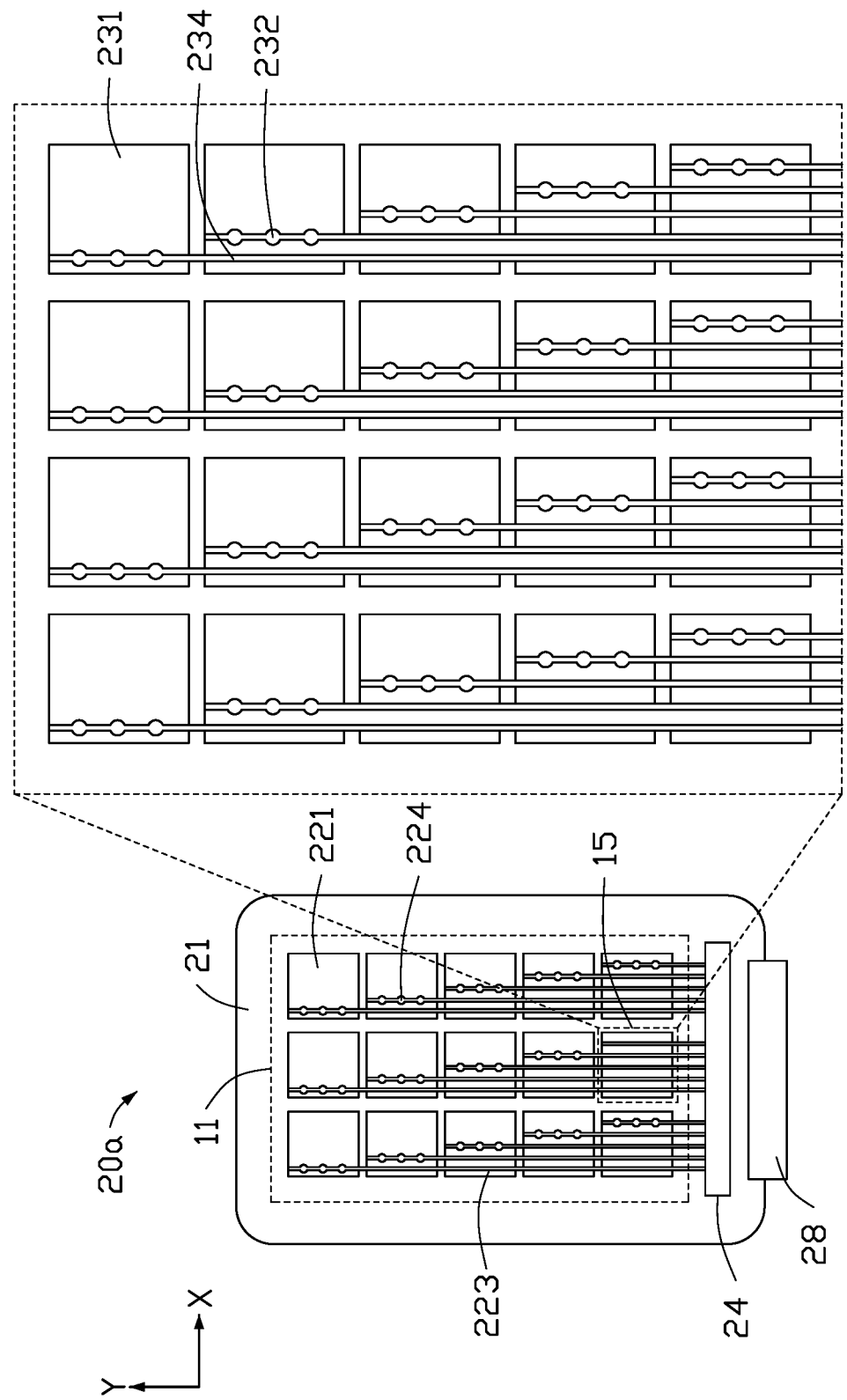
FIG. 3 is a planar view of the first embodiment of the fingerprint identification module of FIG. 2, with one part circled and enlarged.

FIG. 2 shows a first embodiment of the display apparatus 1A. The title "1A" indicates the first embodiment, other embodiments of the display apparatus will be titled "1B", "1C" etc. The display region 11 further includes a fingerprint identification region 15 (as shown in FIG. 3). An area of the fingerprint identification region 15 is smaller than an area of the display region 11. In one embodiment, the fingerprint identification region 15 is located on a central bottom center of the display region 11. The display apparatus 1A includes a first cover 10, a fingerprint identification module 20, a second cover 30, and a display module 40. A sum of thicknesses of the first cover 10, the fingerprint identification module 20, and the second cover 30 is 0.7 millimeters (mm).

The first cover 10 and the second cover 30 are made of transparent material, and seal against dust and other impurities from entering. In one embodiment, the first cover 10 and the second cover 30 can be made of, for example, transparent glass, quartz, or plastic. Suitable materials for the transparent substrate comprise, for example, polycarbonate (PC), polyethylene terephthalate (PET), polymethylmethacrylate, (PMMA), cyclic olefin copolymer (COC), or polyethersulfone (PES), or combinations thereof. The second cover 30 is located between the fingerprint identification module 20 and the display module 40. In one embodiment, the first cover 10 and the second cover 30 are in a first specified thickness. The first specified thickness is 0.175 mm. A shielding layer 17 is located at a surface of the first cover 10 facing the fingerprint identification module 20. The shielding layer 17 is located in the non-display region 15 and is rendered opaque by use of a material such as ink.

FIG. 3 shows the fingerprint identification module 20a with one part circled and enlarged. The fingerprint identification module 20a can sense user's touch in the display region 11 of the first cover 10 and is further configured to accept and recognize, and thus identify, fingerprints applied on the fingerprint identification region 15 of the first cover 10. The fingerprint identification module 20a is located between the first cover 10 and the second cover 30. The fingerprint identification module 20a is pasted on the first cover 10 through a first adhesive layer 50 and is pasted on the second cover 30 through a second adhesive layer 60. A thickness of the first adhesive layer 50 is equal to a thickness of the second adhesive layer 60, which is 0.075 mm. In one embodiment, a thickness of the fingerprint identification module 20a is 0.245 mm. The fingerprint identification module 20a includes a first substrate 21, a touch unit 22, a fingerprint identification unit 23, a control unit 24, and a first printed circuit board (PCB) 28. The touch unit 22 is coplanar with the fingerprint identification unit 23, these are located on a surface of the first substrate 21 facing the first cover 10. The touch unit 22 and the fingerprint identification unit 23 are disposed in the display region 11. The fingerprint identification unit 23 is further disposed in the fingerprint identification region 15.

The first substrate 21 is made of transparent material. In one embodiment, the first substrate 21 can be made of, for example, transparent glass, quartz, or plastic. Suitable materials for the transparent substrate comprise, for example, polycarbonate (PC), polyethylene terephthalate (PET), polymethylmethacrylate, (PMMA), cyclic olefin copolymer (COC), or polyethersulfone (PES), or combinations thereof. A thickness of the first substrate 21 is 0.2 mm.

The touch unit 22 senses a user's touch in the display region 11 of the first cover 10. The touch unit 22 includes a plurality of touch electrodes 221 arranged in a matrix. The touch electrodes 221 are disposed in the display region 11 and surround the fingerprint identification region 15. There is no touch electrode 221 in the fingerprint identification region 15. Each touch electrode 221 is electrically connected with a first metal conductive line 223 through at least one first hole 224. The first metal conductive line 223 establishes an electrical connection between the touch electrode 221 in the display region 11 and the control unit 24 in the non-display region 13. The first metal conductive line 223 is extended along a first direction Y. The touch electrodes 221 cooperate with each other to form a self-capacitance touch sensing structure. In one embodiment, a length of side of the touch electrode 221 is in a range between 4 mm and 5 mm.

An area of the touch electrode 221 is equal to the area of the fingerprint identification region 15. For example, when a size of the touch electrode 221 is 4 mm*4 mm, a size of the fingerprint identification region 15 is also 4 mm*4 mm.

The fingerprint identification unit 23 identify the imprint of fingertips applied on the fingerprint identification region 15 of the first cover 10. In one embodiment, the fingerprint identification unit 23 is a capacitance type fingerprint identification sensor and includes a plurality of fingerprint identification electrodes 231 arranged in a matrix. Each fingerprint identification electrode 231 is connected to a second metal conductive line 234 through at least one second hole 232. The second metal conductive line 234 establishes an electrical connection between the fingerprint identification electrode 231 and the control unit 24. The second metal conductive line 234 is extended along the first direction Y. In one embodiment, the fingerprint identification electrode 231 is substantially square in shape. A length of a side of the fingerprint identification electrode 231 is in a range between 50 μm and 60 μm. For example, when the size of the touch electrode 221 is 4 mm*4 mm, and the size of the fingerprint identification electrode 231 is 50 μm*50 μm, a maximum number of the fingerprint identification electrodes 231 is 16 mm$^2$/2500 μm$^2$=6400, equal to the quantity of second metal conductive lines 234.

The control unit 24 in the non-display region 13 can drive the touch unit 22 and the fingerprint identification unit 23. The control unit 24 is disposed on the surface of the first substrate 21 facing the first cover 10.

The first PCB 28 in the non-display region 13 is disposed on the first substrate 21 and establishes an electrical connection between the control unit 24 and a motherboard (not shown). In one embodiment, the first PCB 28 can be a flexible printed circuit board.

The display module 40 displays images. The display module 40 is pasted on a surface of the second cover 30 facing away from the first cover 10 through the second adhesive layer 60. The display module 40 includes a first polarizer 42, a color filter 43, a thin film transistor (TFT) substrate 45, and a second polarizer 46, overlapped in that order. The display module 40 further includes a second PCB 48. The second PCB 48 is disposed on the TFT substrate 45.

The first polarizer 42 is located between the second cover 30 and the color filter 43. The color filter 43 is located between the first polarizer 42 and the TFT substrate 45. The TFT substrate 45 is located between the color filter 43 and the second polarizer 46. The TFT substrate 45 includes a plurality of TFTs (not shown). The TFT substrate 45 can be made of, for example, transparent glass, quartz, or plastic. Suitable materials for the transparent substrate comprise, for example, polycarbonate (PC), polyethylene terephthalate (PET), polymethylmethacrylate, (PMMA), cyclic olefin copolymer (COC), or polyethersulfone (PES), or combinations thereof. The second PCB 48 establishes an electrical connection between the TFT substrate 45 and the motherboard. In one embodiment, the second PCB 48 can be a flexible printed circuit board.

The display apparatus 1A with the fingerprint identification function integrates the touch unit 22 and the fingerprint identification unit 23 together on a common first substrate 21, and the fingerprint identification unit 23 is disposed in the display region 11. The display apparatus 1A can thus be made with a minimal size of bezel. Further, the second cover 30 supports the fingerprint identification module 20a, thus the structural foundation of the fingerprint identification module 20a is improved, and the fingerprint identification module 20a has more protection against damage during a manufacturing process.

Figure 4:
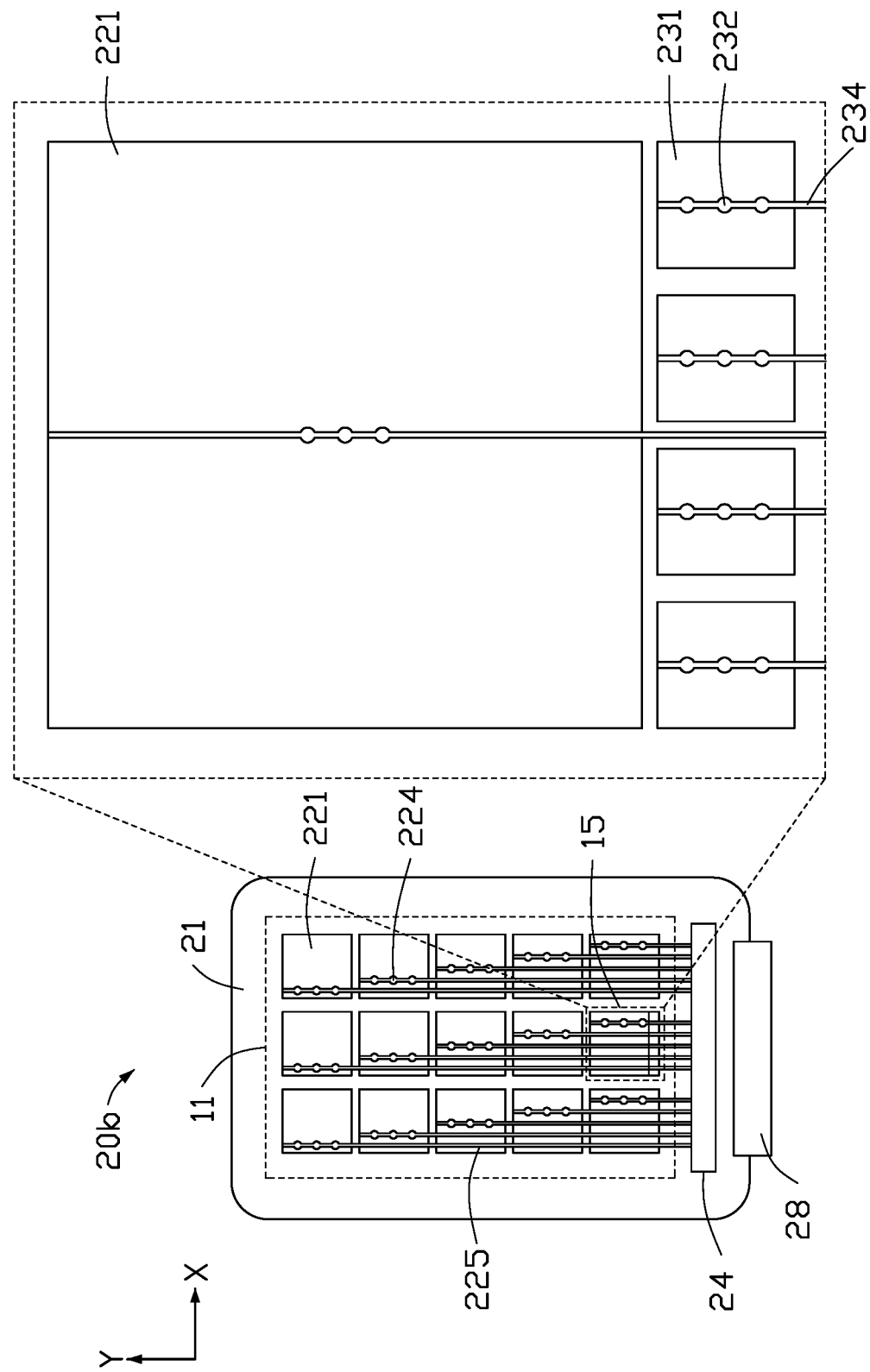
FIG. 4 is a planar view of a second embodiment of the fingerprint identification module of FIG. 2, with one part circled and enlarged.

FIG. 4 shows a second embodiment of the fingerprint identification module 20b with one part circled and enlarged. The fingerprint identification module 20b can sense user's touch in the display region 11 of the first cover 10 and is further configured to identify fingerprints applied on the fingerprint identification region 15 of the first cover 10. The fingerprint identification module 20b is located between the first cover 10 and the second cover 30. The fingerprint identification module 20b is pasted on the first cover 10 through a first adhesive layer 50 and is pasted on the second cover 30 through a second adhesive layer 60. A thickness of the first adhesive layer 50 is equal to a thickness of the second adhesive layer 60, which is 0.075 mm. In one embodiment, a thickness of the fingerprint identification module 20b is 0.245 mm. The fingerprint identification module 20b includes a first substrate 21, a touch unit 22, a fingerprint identification unit 23, a control unit 24, and a first printed circuit board (PCB) 28. The touch unit 22 is coplanar with the fingerprint identification unit 23, these being located on a surface of the first substrate 21. The touch unit 22 and the fingerprint identification unit 23 are disposed in the display region 11. The fingerprint identification unit 23 is further disposed in the fingerprint identification region 15.

The first substrate 21 is made of transparent material. In one embodiment, the first substrate 21 can be made of, for example, transparent glass, quartz, or plastic. Suitable materials for the transparent substrate comprise, for example, polycarbonate (PC), polyethylene terephthalate (PET), polymethylmethacrylate, (PMMA), cyclic olefin copolymer (COC), or polyethersulfone (PES), or combinations thereof. A thickness of the first substrate 21 is 0.2 mm.

The touch unit 22 senses the user's touch in the display region 11 of the first cover 10. The touch unit 22 includes a plurality of touch electrodes 221 arranged in a matrix. The touch electrodes 221 are disposed in the display region 11. At least one touch electrode 221 is disposed in the fingerprint identification region 15. A size of the touch electrode 221 beside the fingerprint identification region 15 is larger than a size of the touch electrode 221 in the fingerprint identification region 15. Each touch electrode 221 is connected to a first metal conductive line 223 through at least one first hole 224. The first metal conductive line 223 establishes an electrical connection between the touch electrode 221 in the display region 11 and the control unit 24 in the non-display region 13. The first metal conductive line 223 is extended along the first direction Y. The touch electrodes 221 cooperate with each other to form a self-capacitance touch sensing structure. In one embodiment, the length of a side of the touch electrode 221 is in a range between 4 mm and 5 mm. An area of the touch electrode 221 beside the fingerprint identification region 15 is equal to an area of the fingerprint identification region 15. For example, when the size of the touch electrode 221 beside the fingerprint identification region 15 is 4 mm*4 mm, the size of the fingerprint identification region 15 is also 4 mm*4 mm.

The fingerprint identification unit 23 can identify a fingerprint on the fingerprint identification region 15 of the first cover 10. In one embodiment, the fingerprint identification unit 23 is a capacitance type fingerprint identification sensor and includes a plurality of fingerprint identification electrodes 231 arranged in a line. The fingerprint identification electrodes 231 are disposed on a side of the touch electrode 221 in the fingerprint identification region 15. In one embodiment, the fingerprint identification electrodes 231 are disposed at the bottom of the touch electrode 221 in the fingerprint identification region 15 along a second direction X, which is perpendicular to the first direction Y. In other embodiments, the fingerprint identification electrodes 231 can be disposed on a left side, a right side, or an upper side of the touch electrode 221 in the fingerprint identification region 15. Each fingerprint identification electrode 231 is connected to a second metal conductive line 234 through at least one second hole 232. The second metal conductive line 234 establishes an electronic connection between the fingerprint identification electrode 231 in the fingerprint identification region 15 and the control unit 24 in the non-display region 13. The second metal conductive line 234 is extended along the first direction Y. In one embodiment, the fingerprint identification electrode 231 is substantially square in shape. A length of a side of the fingerprint identification electrode 231 is in a range between 50 μm and 60 μm.

The control unit 24 in the non-display region 13 can drive the touch unit 22 and the fingerprint identification unit 23. The control unit 24 is disposed on the surface of the first substrate 21 facing the first cover 10.

The first PCB 28 in the non-display region 13 is disposed on the first substrate 21 and can establish an electronic connection between the control unit 24 and a motherboard (not shown). In one embodiment, the first PCB 28 can be a flexible printed circuit board.

The display module 40 displays images. The display module 40 is pasted on a surface of the second cover 30 facing away from the first cover 10 through the second adhesive layer 60. The display module 40 includes a first polarizer 42, a color filter 43, a thin film transistor (TFT) substrate 45, and a second polarizer 46, which are overlapped in that order. The display module 40 further includes a second PCB 48. The second PCB 48 is disposed on the TFT substrate 45.

The first polarizer 42 is located between the second cover 30 and the color filter 43. The color filter 43 is located between the first polarizer 42 and the TFT substrate 45. The TFT substrate 45 is located between the color filter 43 and the second polarizer 46. The TFT substrate 45 includes a plurality of TFTs (not shown). The TFT substrate 45 can be made of, for example, transparent glass, quartz, or plastic. Suitable materials for the transparent substrate comprise, for example, polycarbonate (PC), polyethylene terephthalate (PET), polymethylmethacrylate, (PMMA), cyclic olefin copolymer (COC), or polyethersulfone (PES), or combinations thereof. The second PCB 48 establishes an electrical connection between the TFT substrate 45 and the motherboard. In one embodiment, the second PCB 48 can be a flexible printed circuit board.

With such structure, the display apparatus 1A with the fingerprint identification function integrates the touch unit 22 and the fingerprint identification unit 23 together on a common first substrate 21, and the fingerprint identification unit 23 is disposed in the display region 11, thus a narrow bezel of the display apparatus 1A is achieved. Further, the second cover 30 supports the fingerprint identification module 20b, thus the structural foundation of the fingerprint identification module 20b is improved, and damage to the fingerprint identification module 20b is less likely during a manufacturing process. The number of second conductive lines 234 is thus reduced, and difficulty of manufacturing is reduced.

Figure 5:
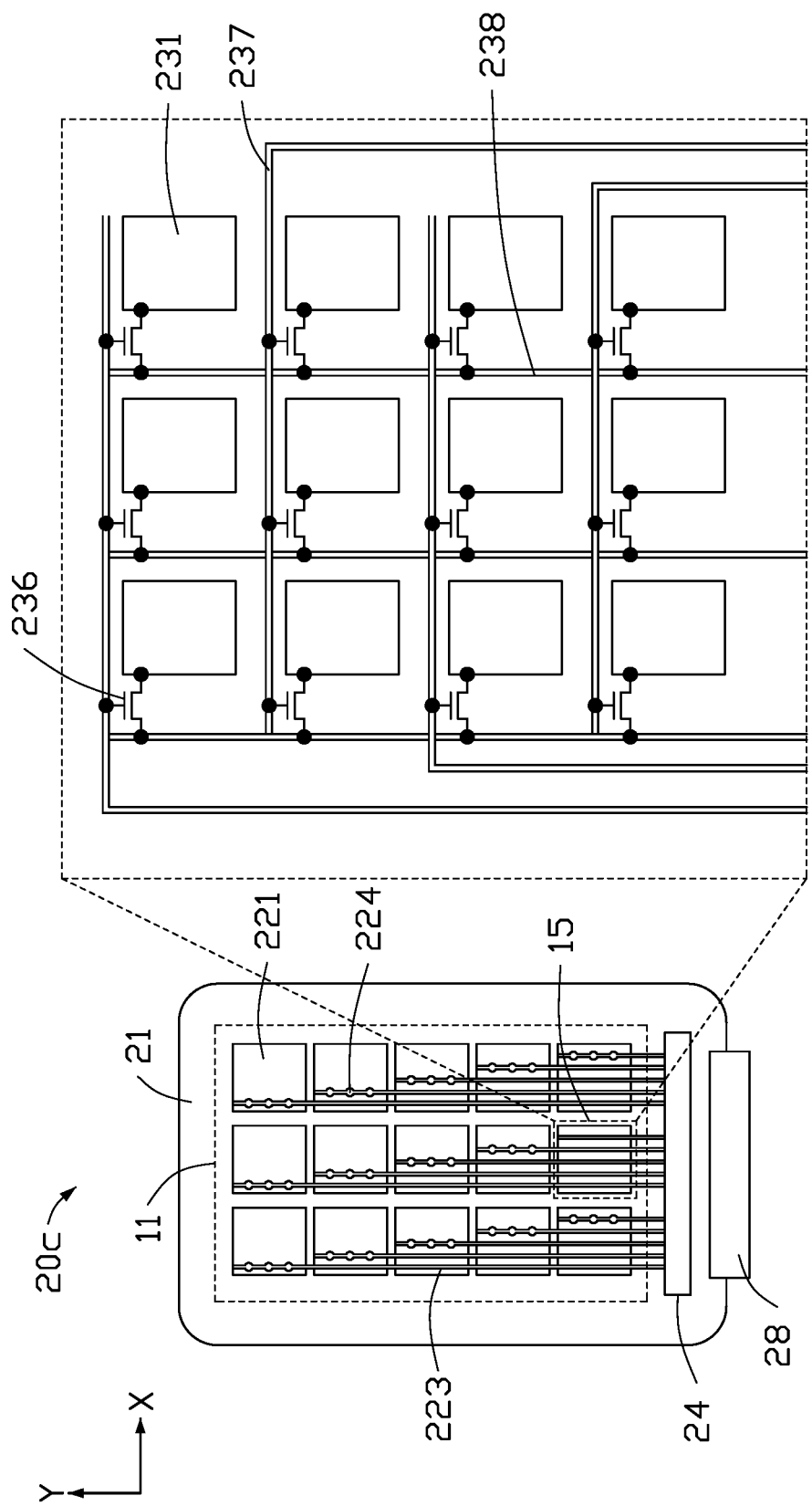
FIG. 5 is a planar view of a third embodiment of the fingerprint identification module of FIG. 2, with one part circled and enlarged.

FIG. 5 shows a third embodiment of the fingerprint identification module 20c with one part circled and enlarged. The fingerprint identification module 20c can sense user's touch in the display region 11 of the first cover 10 and is further configured to identify fingerprints applied on the fingerprint identification region 15 of the first cover 10. The fingerprint identification module 20c is located between the first cover 10 and the second cover 30. The fingerprint identification module 20c is pasted on the first cover 10 through a first adhesive layer 50 and is pasted on the second cover 30 through a second adhesive layer 60. A thickness of the first adhesive layer 50 is equal to a thickness of the second adhesive layer 60, which is 0.075 mm. In one embodiment, a thickness of the fingerprint identification module 20c is 0.245 mm. The fingerprint identification module 20c includes a first substrate 21, a touch unit 22, a fingerprint identification unit 23, a control unit 24, and a first printed circuit board (PCB) 28. The touch unit 22 is coplanar with the fingerprint identification unit 23 on a surface of the first substrate 21. The touch unit 22 and the fingerprint identification unit 23 are disposed in the display region 11. The fingerprint identification unit 23 is further disposed in the fingerprint identification region 15.

The first substrate 21 is made of transparent material. In one embodiment, the first substrate 21 can be made of, for example, transparent glass, quartz, or plastic. Suitable materials for the transparent substrate comprise, for example, polycarbonate (PC), polyethylene terephthalate (PET), polymethylmethacrylate, (PMMA), cyclic olefin copolymer (COC), or polyethersulfone (PES), or combinations thereof. A thickness of the first substrate 21 is 0.2 mm.

The touch unit 22 can sense the user's touch in the display region 11 of the first cover 10. The touch unit 22 includes a plurality of touch electrodes 221 arranged in a matrix. The touch electrodes 221 are disposed in the display region 11. At least one touch electrode 221 is disposed in the fingerprint identification region 15 and surrounds the fingerprint identification region 15. There is no touch electrode 221 in the fingerprint identification region 15. Each touch electrode 221 is connected to a first metal conductive line 223 through at least one first hole 224. The first metal conductive line 223 establishes an electronic connection between the touch electrode 221 in the display region 11 and the control unit 24 in the non-display region 13. The first metal conductive line 223 is extended along the first direction Y. The touch electrodes 221 cooperate with each other to form a self-capacitance touch sensing structure. In one embodiment, the length of a side of the touch electrode 221 is in a range between 4 mm and 5 mm. An area of one touch electrode 221 is equal to the area of the fingerprint identification region 15. For example, when the size of the touch electrode 221 is 4 mm*4 mm, the size of the fingerprint identification region 15 is also 4 mm*4 mm.

The fingerprint identification unit 23 can identify fingerprints applied on the fingerprint identification region 15 of the first cover 10. In one embodiment, the fingerprint identification unit 23 is a capacitance type fingerprint identification sensor and includes a plurality of fingerprint identification electrodes 231 arranged in a matrix. Each fingerprint identification electrode 231 corresponds to a switch element 236. Each fingerprint identification electrode 231 is electrically connected to the control unit 24 through the switch element 236. A control terminal of the switch element 236 is electrically connected to the touch unit through a first control line 237, and a first connection terminal of the switch element 236 is electrically connected to the touch unit 24 through a second control line 238. A second connection terminal of the switch element 236 is electrically connected to the corresponding fingerprint identification electrode 231. In one embodiment, the switch element 236 is a TFT. The control unit 24 turns on the switch elements 236 for fingerprint identification by the fingerprint identification electrodes 231. The control unit 24 can turn off the switch elements 236 so that the fingerprint identification electrodes 231 do not operate. The fingerprint identification electrodes 231 in one row are electrically connected to a common first control line 237, and the fingerprint identification electrodes 231 in one column are electrically connected to a common second control line 238. The first control line 237 includes a first section extending along the first direction Y and a second section extending along the second direction X. The second sections of the odd first control lines 237 are disposed on a left side of the fingerprint identification electrodes 231, those of the even first control lines 237 are disposed on a right side of the fingerprint identification electrodes 231. The second control line 238 extending along the first direction Y is insulated from the first control line 237. In one embodiment, the fingerprint identification electrode 231 is substantially square in shape. The length of a side of the fingerprint identification electrode 231 is in a range between 50 μm and 60 μm. For example, when the size of the touch electrode 221 is 4 mm*4 mm, and the size of the fingerprint identification electrode 231 is 50 μm*50 μm, a maximum number of fingerprint identification electrodes 231 is 16 mm$^2$/2500 μm$^2$=6400, equal to quantity of second metal conductive lines 234. The fingerprint identification electrodes 231 are arranged in an 80*80 matrix. Thus, a number of the first control lines 237 are 80, and a number of the second control lines 238 are 80. A total number of metal conductive lines in the fingerprint identification region 15 is 160, which is less than the sum of the second metal conductive lines 234.

The control unit 24 in the non-display region 13 can drive the touch unit 22 and the fingerprint identification unit 23. The control unit 24 is disposed on the first substrate 21.

The first PCB 28 in the non-display region 13 is disposed on the first substrate 21 and can establish an electronic connection between the control unit 24 and a motherboard (not shown). In one embodiment, the first PCB 28 can be a flexible printed circuit board.

The display module 40 displays images. The display module 40 is pasted on a surface of the second cover 30 facing away from the first cover 10 through the second adhesive layer 60. The display module 40 includes a first polarizer 42, a color filter 43, a thin film transistor (TFT) substrate 45, and a second polarizer 46, which are overlapped in that order. The display module 40 further includes a second PCB 48. The second PCB 48 is disposed on the TFT substrate 45.

The first polarizer 42 is located between the second cover 30 and the color filter 43. The color filter 43 is located between the first polarizer 42 and the TFT substrate 45. The TFT substrate 45 is located between the color filter 43 and the second polarizer 46. The TFT substrate 45 includes a plurality of TFTs (not shown). The TFT substrate 45 can be made of, for example, transparent glass, quartz, or plastic. Suitable materials for the transparent substrate comprise, for example, polycarbonate (PC), polyethylene terephthalate (PET), polymethylmethacrylate, (PMMA), cyclic olefin copolymer (COC), or polyethersulfone (PES), or combinations thereof. The second PCB 48 establishes an electrical connection between the TFT substrate 45 and the motherboard. In one embodiment, the second PCB 48 can be a flexible printed circuit board.

Based on the above recited structure, the display apparatus 1A with the fingerprint identification function integrates the touch unit 22 and the fingerprint identification unit 23 together on a common first substrate 21, and the fingerprint identification unit 23 is disposed in the display region 11, thus a narrow bezel of the display apparatus 1A is achieved. Further, the second cover 30 supports the fingerprint identification module 20c, thus the structural foundation of the fingerprint identification module 20c is improved, and the fingerprint identification module 20b is not likely to be damaged during a manufacturing process. The number of metal conductive lines in the fingerprint identification region 15 is reduced based on the switch elements 236, thus a manufacturing difficulty of the display apparatus 1A is reduced.

Figure 6:
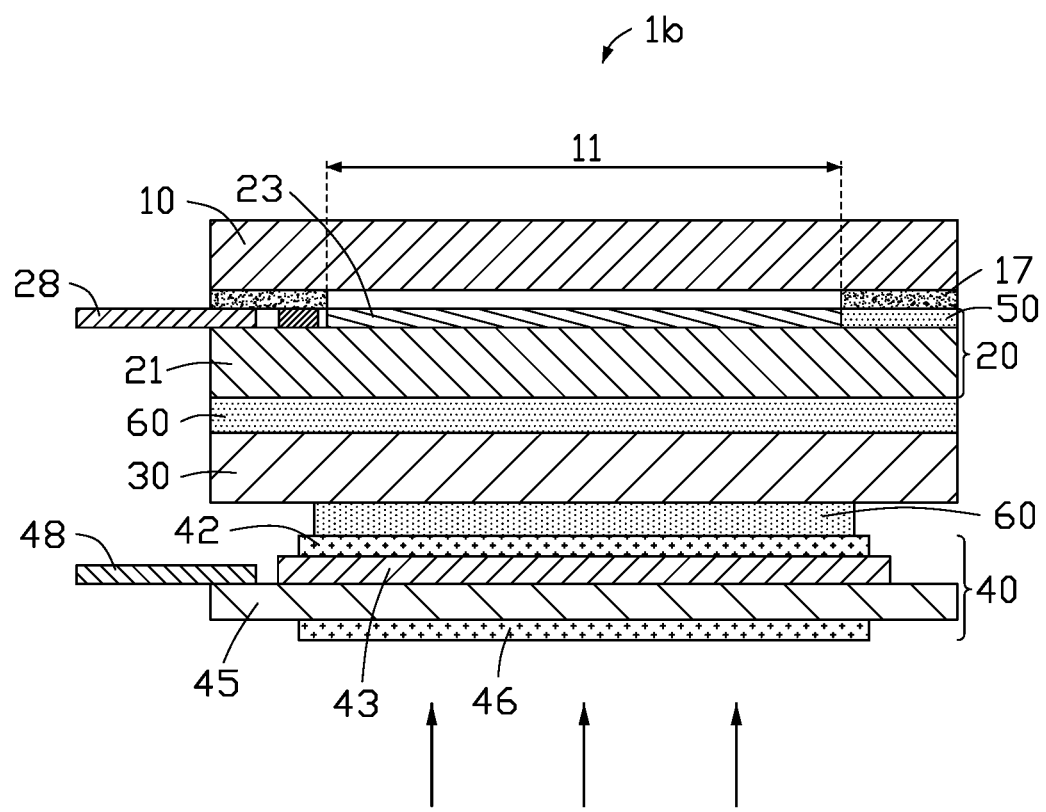
FIG. 6 is a cross-sectional view along line II-II of FIG. 1, the fingerprint identification module of the second embodiment being included in the display apparatus.
Figure 7:
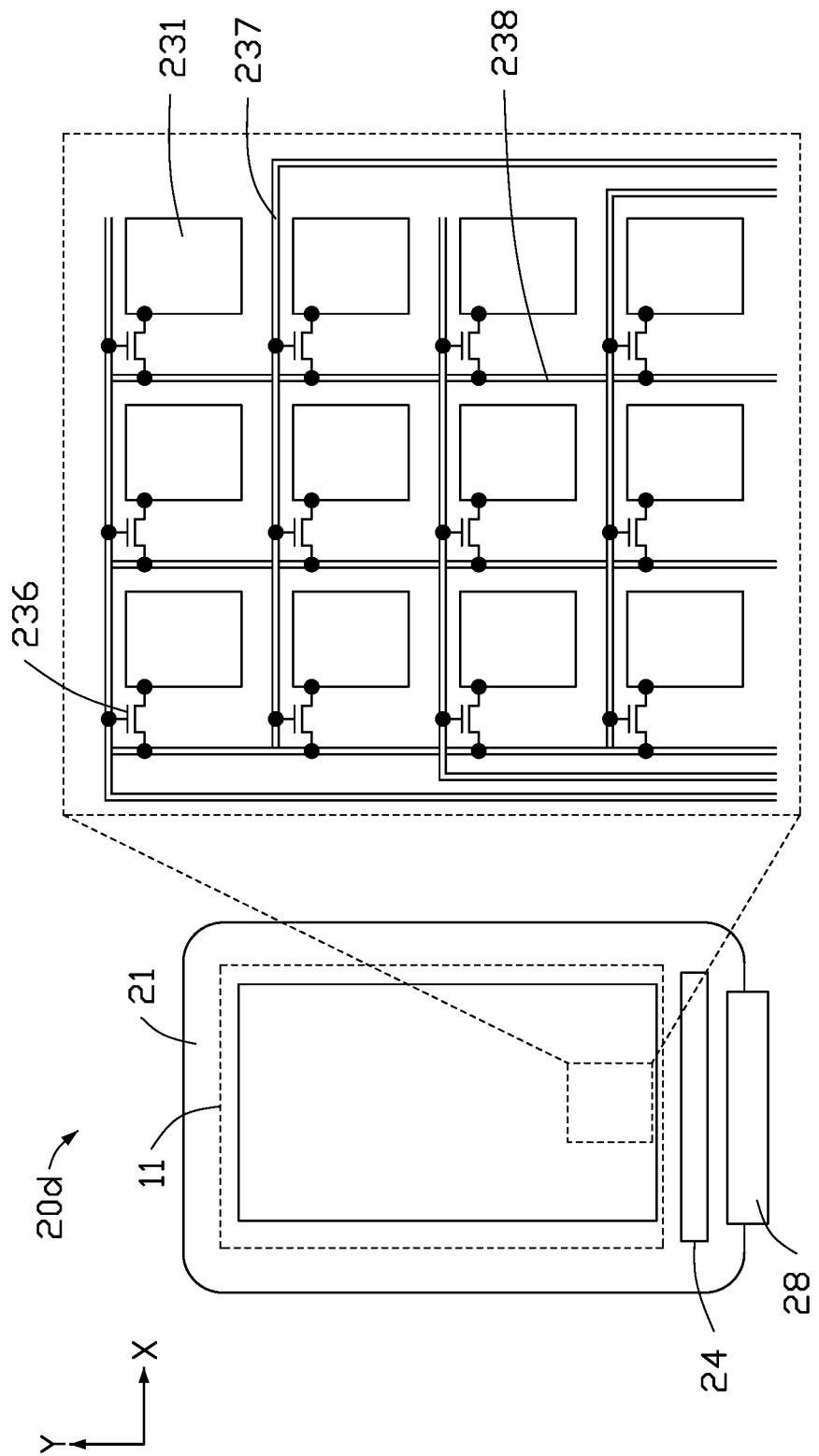
FIG. 7 is a planar view of an embodiment of the fingerprint identification module of FIG. 6 with one part circled and enlarged.

FIG. 6 shows a second embodiment of the display apparatus (display apparatus 1B) taken along the line II-II. The display region 11 also serves as the fingerprint identification region 15 (as shown in FIG. 7). A size of the fingerprint identification region 15 is equal to a size of the display region 11. The display apparatus 1B includes a first cover 10, a fingerprint identification module 20d, a second cover 30, and a display module 40. A sum of thicknesses of the first cover 10, the fingerprint identification module 20d, and the second cover 30 is 0.7 millimeter (mm).

The first cover 10 and the second cover 30 are made of transparent material sealed against dust and other impurities. In one embodiment, the first cover 10 and the second cover 30 can be made of, for example, transparent glass, quartz, or plastic. Suitable materials for the transparent substrate comprise, for example, polycarbonate (PC), polyethylene terephthalate (PET), polymethylmethacrylate, (PMMA), cyclic olefin copolymer (COC), or polyethersulfone (PES), or combinations thereof. The second cover 30 is located between the fingerprint identification module 20d and the display module 40. In one embodiment, the first cover 10 and the second cover 30 are of a first specified thickness. The first specified thickness is 0.175 mm. A shielding layer 17 is located at a surface of the first cover 10 facing the fingerprint identification module 20d. The shielding layer 17 is located in the non-display region 15 and is made of opaque material.

FIG. 7 shows a fourth embodiment of the fingerprint identification module 20d with one part circled and enlarged. The fingerprint identification module 20d can identify fingerprints applied on the fingerprint identification region 15 of the first cover 10. The fingerprint identification module 20d is located between the first cover 10 and the second cover 30. The fingerprint identification module 20d is pasted on the first cover 10 through a first adhesive layer 50 and is pasted on the second cover 30 through a second adhesive layer 60. A thickness of the first adhesive layer 50 is equal to a thickness of the second adhesive layer 60, which is 0.075 mm. In one embodiment, a thickness of the fingerprint identification module 20d is 0.245 mm. The fingerprint identification module 20d includes a first substrate 21, a fingerprint identification unit 23, a control unit 24, and a first printed circuit board (PCB) 28. The fingerprint identification unit 23 is disposed in the fingerprint identification region 15.

The first substrate 21 is made of transparent material. In one embodiment, the first substrate 21 can be made of, for example, transparent glass, quartz, or plastic. Suitable materials for the transparent substrate comprise, for example, polycarbonate (PC), polyethylene terephthalate (PET), polymethylmethacrylate, (PMMA), cyclic olefin copolymer (COC), or polyethersulfone (PES), or combinations thereof. A thickness of the first substrate 21 is 0.2 mm.

The fingerprint identification unit 23 in the fingerprint identification region 15 is disposed on the surface of the first substrate 21 facing the first cover 10. The fingerprint identification unit 23 can identify fingerprints applied on the fingerprint identification region 15 of the first cover 10. In one embodiment, the fingerprint identification unit 23 is a capacitance type fingerprint identification sensor and includes a plurality of fingerprint identification electrodes 231 arranged in a matrix. Each fingerprint identification electrode 231 corresponds to a switch element 236. Each fingerprint identification electrode 231 is electrically connected to the control unit 24 through a switch element 236. A control terminal of the switch element 236 is electrically connected to the touch unit through a first control line 237. A first connection terminal of the switch element 236 is electrically connected to the touch unit 24 through a second control line 238. A second connection terminal of the switch element 236 is electrically connected to a fingerprint identification electrode 231. In one embodiment, the switch element 236 is a TFT. The control unit 24 turns on the switch elements 236 for fingerprint identification through the fingerprint identification electrodes 231. The control unit 24 further turns off the switch elements 236 so that the fingerprint identification electrodes 231 do not operate. The fingerprint identification electrodes 231 in one row are electrically connected to a common first control line 237, and the fingerprint identification electrodes 231 in one column are electrically connected to a common second control line 238. The first control line 237 includes a first section extending along the first direction Y and a second section extending along the second direction X. The second sections of the odd first control lines 237 are disposed on a left side of the fingerprint identification electrodes 231, and the second sections of the even first control lines 237 are disposed on a right side of the fingerprint identification electrodes 231. The second control line 238 extending along the first direction Y is insulated from the first control line 237. In one embodiment, the fingerprint identification electrode 231 is substantially in a square shape. The length of a side of the fingerprint identification electrode 231 is in a range between 50 μm and 60 μm.

The control unit 24 in the non-display region 13 can drive the touch unit 22 and the fingerprint identification unit 23. The control unit 24 is disposed on the first substrate 21.

The first PCB 28 in the non-display region 13 is disposed on the first substrate 21 and can establish an electronic connection between the control unit 24 and a motherboard (not shown). In one embodiment, the first PCB 28 can be a flexible printed circuit board.

The display module 40 displays images. The display module 40 is pasted on a surface of the second cover 30 facing away from the first cover 10 through the second adhesive layer 60. The display module 40 includes a first polarizer 42, a color filter 43, a thin film transistor (TFT) substrate 45, and a second polarizer 46, which are overlapped in that order. The display module 40 further includes a second PCB 48. The second PCB 48 is disposed on the TFT substrate 45.

The first polarizer 42 is located between the second cover 30 and the color filter 43. The color filter 43 is located between the first polarizer 42 and the TFT substrate 45. The TFT substrate 45 is located between the color filter 43 and the second polarizer 46. The TFT substrate 45 includes a plurality of TFTs (not shown). The TFT substrate 45 can be made of, for example, transparent glass, quartz, or plastic. Suitable materials for the transparent substrate comprise, for example, polycarbonate (PC), polyethylene terephthalate (PET), polymethylmethacrylate, (PMMA), cyclic olefin copolymer (COC), or polyethersulfone (PES), or combinations thereof. The second PCB 48 establishes an electrical connection between the TFT substrate 45 and the motherboard. In one embodiment, the second PCB 48 can be a flexible printed circuit board.

Based on the above recited structure, the fingerprint identification unit 23 is disposed in the display region 11, thus the full extent of display region 11 of the display apparatus 1B can be used for identifying fingerprints. Further, the second cover 30 supports the fingerprint identification module 20d, thus the structural foundation of the fingerprint identification module 20d is improved.

Figure 8:
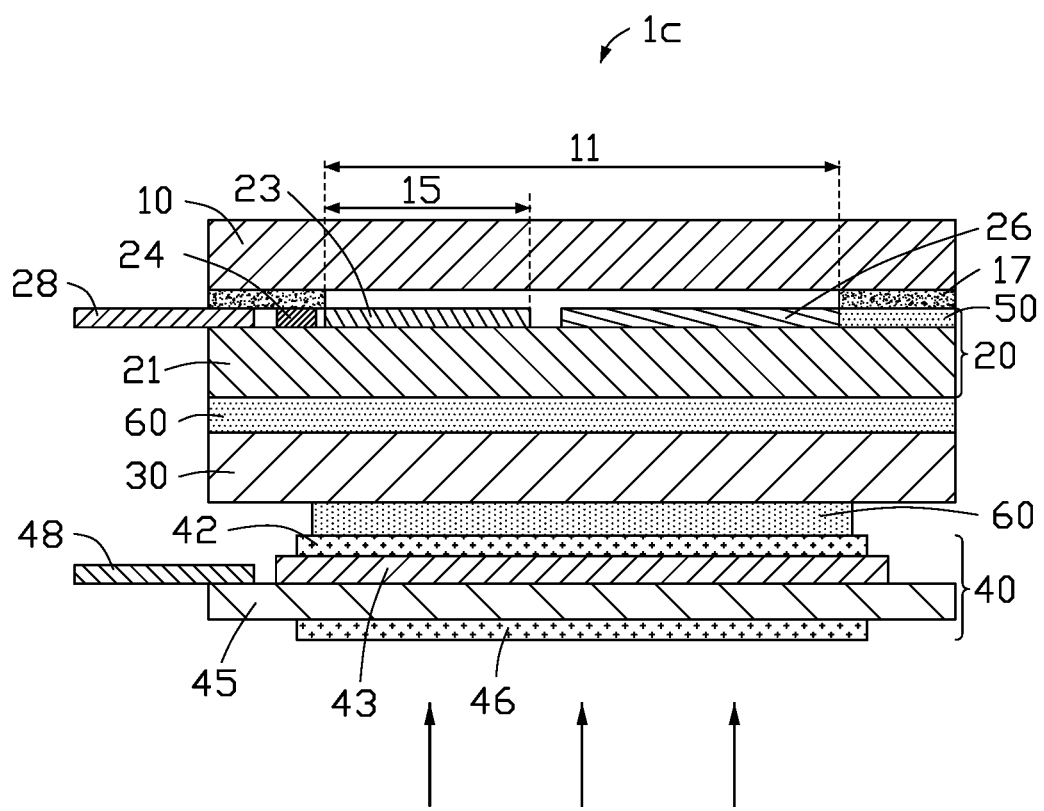
FIG. 8 is a cross-sectional view along line II-II of FIG. 1, a fingerprint identification module in a third embodiment being included in the display apparatus.
Figure 9:
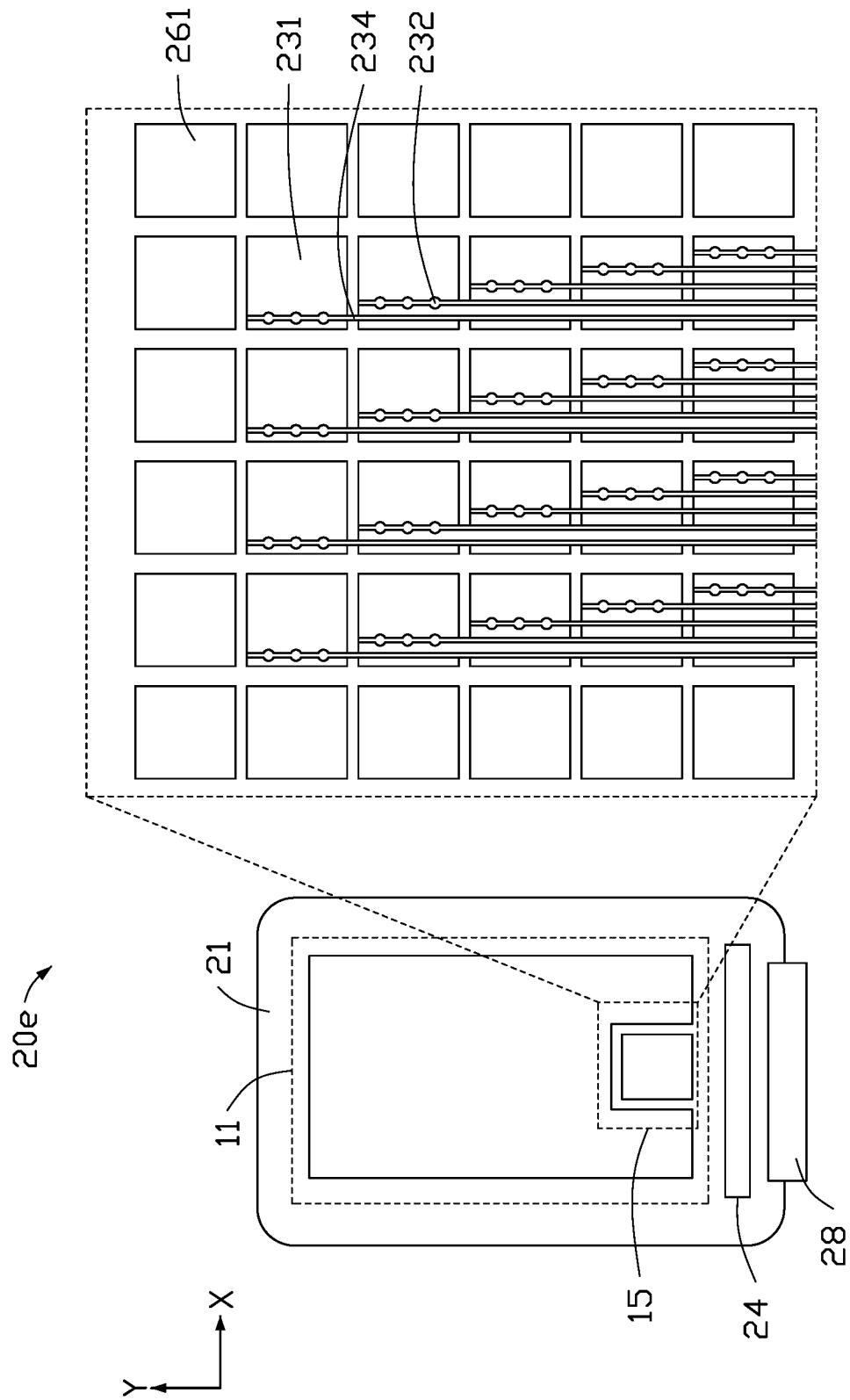
FIG. 9 is a planar view of the fingerprint identification module of FIG. 8 with one part circled and enlarged.

FIG. 8 shows a third embodiment of the display apparatus 1C taken along the line II-II. The display region 11 further defines further includes a fingerprint identification region 15 (as shown in FIG. 9). An area of the fingerprint identification region 15 is smaller than an area of the display region 11. In one embodiment, the fingerprint identification region 15 is located on a central bottom of the display region 11. The display apparatus 1C includes a first cover 10, a fingerprint identification module 20e, a second cover 30, and a display module 40. A sum of thicknesses of the first cover 10, the fingerprint identification module 20e, and the second cover 30 is 0.7 millimeter (mm).

The first cover 10 and the second cover 30 are made of transparent material sealed against dust and other impurities. In one embodiment, the first cover 10 and the second cover 30 can be made of, for example, transparent glass, quartz, or plastic. Suitable materials for the transparent substrate comprise, for example, polycarbonate (PC), polyethylene terephthalate (PET), polymethylmethacrylate, (PMMA), cyclic olefin copolymer (COC), or polyethersulfone (PES), or combinations thereof. The second cover 30 is located between the fingerprint identification module 20e and the display module 40. In one embodiment, the first cover 10 and the second cover 30 are in a first specified thickness. The first specified thickness is 0.175 mm. A shielding layer 17 is located at a surface of the first cover 10 facing the fingerprint identification module 20e. The shielding layer 17 is located in the non-display region 15 and is made of opaque material or material rendered opaque.

FIG. 9 shows a fifth embodiment of the fingerprint identification module 20e with one part circled and enlarged. The fingerprint identification module 20e is located between the first cover 10 and the second cover 30. The fingerprint identification module 20e is pasted on the first cover 10 through a first adhesive layer 50 and is pasted on the second cover 30 through a second adhesive layer 60. A thickness of the first adhesive layer 50 is equal to a thickness of the second adhesive layer 60, which is 0.075 mm. In one embodiment, a thickness of the fingerprint identification module 20e is 0.245 mm. The fingerprint identification module 20e includes a first substrate 21, a fingerprint identification unit 23, a control unit 24, a first dummy unit 26, and a first printed circuit board (PCB) 28. The fingerprint identification unit 23 is further disposed in the fingerprint identification region 15.

The fingerprint identification unit 23 in the fingerprint identification region 15 is disposed on the surface of the first substrate 21 facing the first cover 10. The fingerprint identification unit 23 can identify fingerprints applied on the fingerprint identification region 15 of the first cover 10. In one embodiment, the fingerprint identification unit 23 is a capacitance type fingerprint identification sensor and includes a plurality of fingerprint identification electrodes 231 arranged in a matrix. Each fingerprint identification electrode 231 is electrically connected with a corresponding second metal conductive line 234 through at least one second hole 232. The second metal conductive line 234 establishes an electronic connection between the fingerprint identification electrode 231 in the fingerprint identification region 15 and the control unit 24 in the non-display region 13. The second metal conductive line 234 is extended along the first direction Y. In one embodiment, the fingerprint identification electrode 231 is substantially in a square shape. A length of a side of the fingerprint identification electrode 231 is in a range between 50 µm and 60 µm.

The control unit 24 in the non-display region 13 can drive the touch unit 22 and the fingerprint identification unit 23. The control unit 24 is disposed on the first substrate 21.

The first dummy unit 26 is disposed on the surface of the first substrate 21. The first dummy unit 26 includes a plurality of first dummy electrodes 261 arranged in a matrix. The first dummy electrodes 261 and the fingerprint identification electrodes 231 are evenly disposed, allowing uniform light transmittance in the display region 11. The first dummy electrodes 261 in the display region 11, and at least one first dummy electrode 261, is in the fingerprint identification region 15. The at least one first dummy electrode 261 in the fingerprint identification region 15 surrounds the fingerprint identification electrodes 231. A size of the first dummy electrode 261 is equal to a size of the fingerprint identification electrode 231.

The first PCB 28 in the non-display region 13 is disposed on the first substrate 21 and can establish an electronic connection between the control unit 24 and a motherboard (not shown). In one embodiment, the first PCB 28 can be a flexible printed circuit board.

The display module 40 displays images. The display module 40 is pasted on a surface of the second cover 30 facing away from the first cover 10 through the second adhesive layer 60. The display module 40 includes a first polarizer 42, a color filter 43, a thin film transistor (TFT) substrate 45, and a second polarizer 46, which are overlapped in that order. The display module 40 further includes a second PCB 48. The second PCB 48 is disposed on the TFT substrate 45.

The first polarizer 42 is located between the second cover 30 and the color filter 43. The color filter 43 is located between the first polarizer 42 and the TFT substrate 45. The TFT substrate 45 is located between the color filter 43 and the second polarizer 46. The TFT substrate 45 includes a plurality of TFTs (not shown). The TFT substrate 45 can be made of, for example, transparent glass, quartz, or plastic. Suitable materials for the transparent substrate comprise, for example, polycarbonate (PC), polyethylene terephthalate (PET), polymethylmethacrylate, (PMMA), cyclic olefin copolymer (COC), or polyethersulfone (PES), or combinations thereof. The second PCB 48 establishes an electrical connection between the TFT substrate 45 and the motherboard. In one embodiment, the second PCB 48 can be a flexible printed circuit board.

Based on the above recited structure, the fingerprint identification unit 23 is disposed in the display region 11, thus a narrow bezel of the display apparatus 1C is achieved. Further, the second cover 30 supports the fingerprint identification module 20e, thus the structural foundation of the fingerprint identification module 20e is improved, and the fingerprint identification module 20e is less likely to be damaged during a manufacturing process. Further, the dummy electrodes 261 and the fingerprint identification electrodes 231 are evenly disposed for uniform light transmittance in the display region 11.

Figure 10:
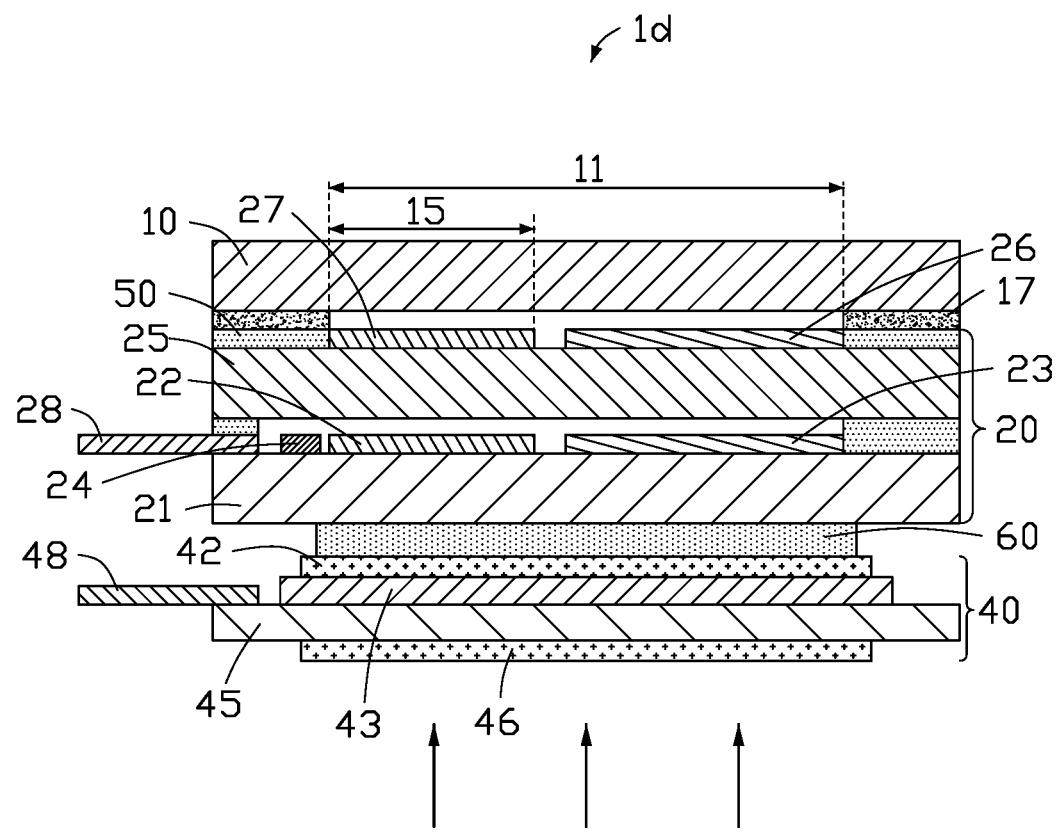
FIG. 10 is a cross-sectional view along line II-II of FIG. 1, the display apparatus in a fourth embodiment including a second substrate.
Figure 11:
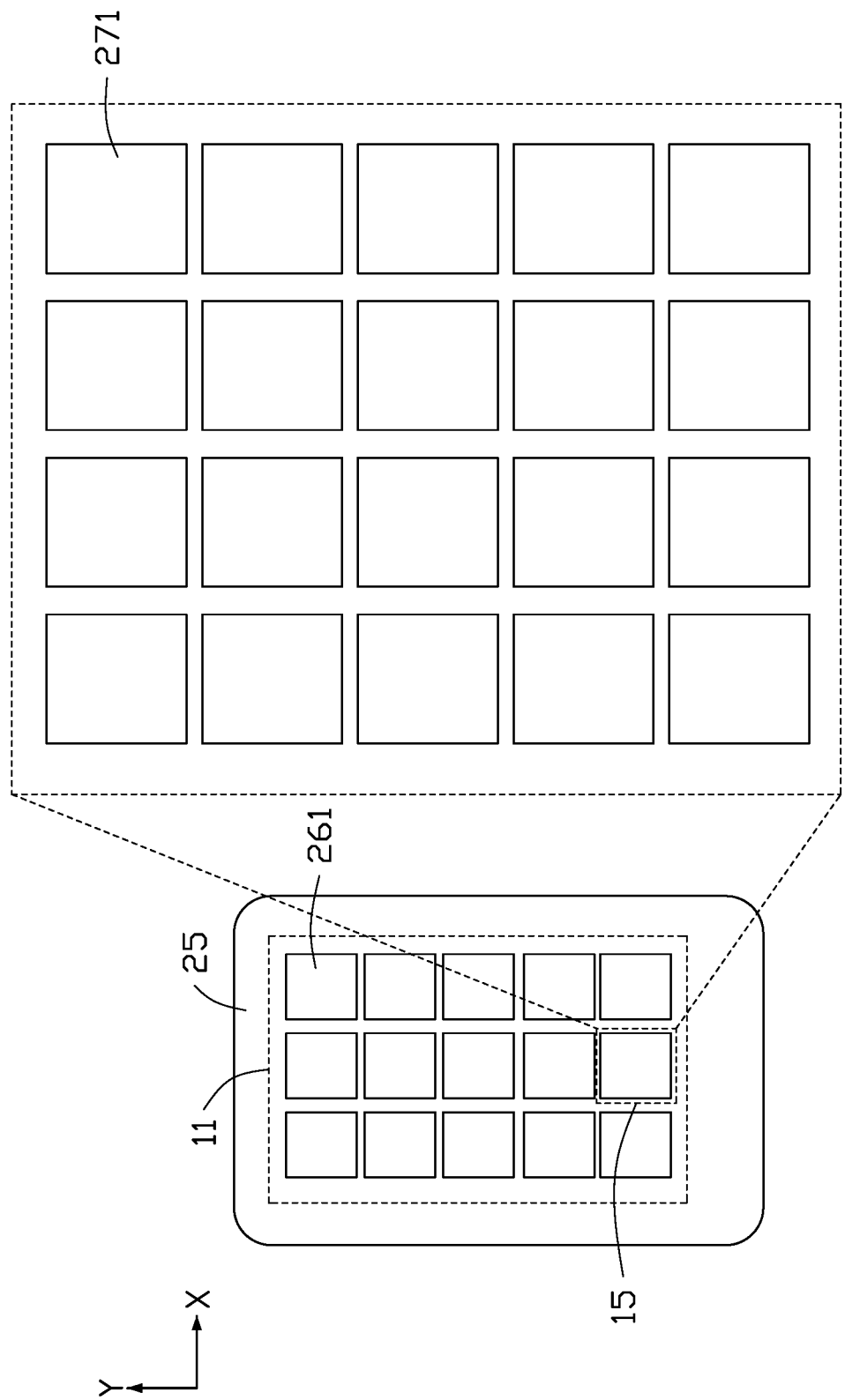
FIG. 11 is a planar view of an embodiment of the second substrate of FIG. 10 with one part circled and enlarged.

FIG. 10 shows a cross-section view of a fourth embodiment of the display apparatus 1D taken along the line II-II. The display region 11 further includes a fingerprint identification region 15 (as shown in FIG. 11). An area of the fingerprint identification region 15 is smaller than an area of the display region 11. In one embodiment, the fingerprint identification region 15 is located on a central bottom of the display region 11. The display apparatus 1D includes a first cover 10, a fingerprint identification module 20, and a display module 40. A sum of thicknesses of the first cover 10 and the fingerprint identification module 20 is 0.7 millimeter (mm).

The first cover 10 and the second cover 30 are made of transparent material sealed against dust and other impurities. In one embodiment, the first cover 10 can be made of, for example, transparent glass, quartz, or plastic. Suitable materials for the transparent substrate comprise, for example, polycarbonate (PC), polythylene terephthalate (PET), polymethylmethacrylate, (PMMA), cyclic olefin copolymer (COC), or polyethersulfone (PES), or combinations thereof. In one embodiment, the first cover 10 is in a first specified thickness. The first specified thickness is 0.175 mm. A shielding layer 17 is located at a surface of the first cover 10 facing the fingerprint identification module 20. The shielding layer 17 is located in the non-display region 15 and is made of opaque material.

FIG. 11 shows a sixth embodiment of the fingerprint identification module 20 with one part circled and enlarged. The fingerprint identification module 20 is located between the first cover 10 and the display module 40. The fingerprint identification module 20 is pasted on the first cover 10 through a first adhesive layer 50 and is pasted on the display module 40 through a second adhesive layer 60. A thickness of the first adhesive layer 50 is equal to a thickness of the second adhesive layer 60, which is 0.075 mm. In one embodiment, a thickness of the fingerprint identification module 20 is 0.245 mm. The fingerprint identification module 20 includes a first substrate 21, a touch unit 22, a fingerprint identification unit 23, a control unit 24, a second substrate 25, a first dummy unit 26, a second dummy unit 27, and a first printed circuit board (PCB) 28. The touch unit 22 is coplanar with the fingerprint identification unit 23, these being located on a surface of the first substrate 21 facing the first cover 10. The touch unit 22 and the fingerprint identification unit 23 are disposed in the display region 11. The fingerprint identification unit 23 is further disposed in the fingerprint identification region 15.

The first substrate 21 and the second substrate 25 are made of transparent material. In one embodiment, the first substrate 21 and the second substrate 25 can be made of, for example, transparent glass, quartz, or plastic. Suitable materials for the transparent substrate comprise, for example, polycarbonate (PC), polythylene terephthalate (PET), polymethylmethacrylate, (PMMA), cyclic olefin copolymer (COC), or polyethersulfone (PES), or combinations thereof. A thickness of the first substrate 21 is equal to a thickness of the second substrate 25, which is 0.2 mm. The first substrate 21 is disposed between the second substrate 25 and the display module 40. The second substrate 25 is disposed between the first cover 10 and the first substrate 21.

The touch unit 22 can sense the user's touch in the display region 11 of the first cover 10. The touch unit 22 includes a plurality of touch electrodes 221 arranged in a matrix. The touch electrodes 221 are disposed in the display region 11 and surround the fingerprint identification region 15. There is no touch electrode 221 in the fingerprint identification region 15. Each touch electrode 221 is electrically connected with a corresponding first metal conductive line 223 through at least one first hole 224. The first metal conductive line 223 establishes an electronic connection between the touch electrode 221 in the display region 11 and the control unit 24 in the non-display region 13. The first metal conductive line 223 is extended along a first direction Y. The touch electrodes 221 cooperate with each other to form a self-capacitance touch sensing structure. In one embodiment, a length of a side of the touch electrode 221 is in a range between 4 mm and 5 mm. An area of the touch electrode 221 is equal to the area of the fingerprint identification region 15. For example, when a size of the touch electrode 221 is 4 mm*4 mm, a size of the fingerprint identification region 15 is also 4 mm*4 mm.

The fingerprint identification unit 23 can identify fingerprints applied on the fingerprint identification region 15 of the first cover 10. In one embodiment, the fingerprint identification unit 23 is a capacitance type fingerprint identification sensor and includes a plurality of fingerprint identification electrodes 231 arranged in a matrix. Each fingerprint identification electrodes 231 is electrically connected with a corresponding second metal conductive line 234 through at least one second hole 232. The second metal conductive line 234 establishes an electronic connection between the fingerprint identification electrode 231 in the fingerprint identification region 15 and the control unit 24 in the non-display region 13. The second metal conductive line 234 is extended along the first direction Y. In one embodiment, the fingerprint identification electrode 231 is substantially square in shape. A length of a side of the fingerprint identification electrode 231 is in a range between 50 μm and 60 μm.

The control unit 24 in the non-display region 13 can drive the touch unit 22 and the fingerprint identification unit 23. The control unit 24 is disposed on the first substrate 21.

FIG. 11 shows the second substrate 25 with one part circled and enlarged. The first dummy unit 26 is disposed on a surface of the second substrate 25 facing the first cover 21. Due to a capacitor coupling function, the first dummy unit 26 triggers the touch unit 22 to sense user's touch on the first cover 10. The first dummy unit 26 includes a plurality of first dummy electrodes 261 arranged in a matrix. The first dummy electrodes 261 are disposed in the display region 11 and surround the fingerprint identification region 15. There is no first dummy electrode 261 in the fingerprint identification region 15. Each first dummy electrode 261 corresponds to one touch electrode 221. A projection of the first dummy electrode 261 overlaps with the corresponding touch electrode 221 along a light emitting direction. A size of the first dummy electrode 261 is equal to the size of the touch electrode 221. In one embodiment, the first dummy electrode 261 is substantially square in shape. A length of a side of the first dummy electrode 261 is in a range between 4 mm and 5 mm.

The second dummy unit 27 is disposed on a surface of the second substrate 25 facing the first cover 10. A size of the second dummy unit 27 is equal to a size of the first dummy electrode 261 and is further equal to the size of the fingerprint identification electrode 231. Due to a capacitor coupling function, the second dummy unit 27 triggers the fingerprint identification unit 23 to sense user's fingerprint on the first cover 10. The second dummy unit 27 includes a plurality of second dummy electrodes 271 arranged in a matrix in the fingerprint identification region 15. Each second dummy electrode 271 corresponds to one fingerprint identification electrode 231. A projection of the second dummy electrode 271 is overlapped with the corresponding fingerprint identification electrode 231 along the light emitting direction. A size of the second dummy electrode 271 is less than the size of the first dummy electrode 261 and is equal to the size of the fingerprint identification electrode 231. In one embodiment, the second dummy electrode 271 is substantially square in shape. A length of a side of the second dummy electrode 271 is in a range between 50 μm and 60 μm.

The first PCB 28 in the non-display region 13 is disposed on the first substrate 21 and can establish an electronic connection between the control unit 24 and a motherboard (not shown). In one embodiment, the first PCB 28 can be a flexible printed circuit board.

The display module 40 displays images. The display module 40 is pasted on a surface of the second cover 30 facing away from the first cover 10 through the second adhesive layer 60. The display module 40 includes a first polarizer 42, a color filter 43, a thin film transistor (TFT) substrate 45, and a second polarizer 46, which are overlapped in that order. The display module 40 further includes a second PCB 48. The second PCB 48 is disposed on the TFT substrate 45.

The first polarizer 42 is located between the second cover 30 and the color filter 43. The color filter 43 is located between the first polarizer 42 and the TFT substrate 45. The TFT substrate 45 is located between the color filter 43 and the second polarizer 46. The TFT substrate 45 includes a plurality of TFTs (not shown). The TFT substrate 45 can be made of, for example, transparent glass, quartz, or plastic. Suitable materials for the transparent substrate comprise, for example, polycarbonate (PC), polythylene terephthalate (PET), polymethylmethacrylate, (PMMA), cyclic olefin copolymer (COC), or polyethersulfone (PES), or combinations thereof. The second PCB 48 establishes an electrical connection between the TFT substrate 45 and the motherboard. In one embodiment, the second PCB 48 can be a flexible printed circuit board.

Based on the above recited structure, the display apparatus 1A with the fingerprint identification function integrates the touch unit 22 and the fingerprint identification unit 23 on a common first substrate 21, and the fingerprint identification unit 23 is disposed in the display region 11, thus a narrow bezel of the display apparatus 1A is achieved. Further, the first dummy unit 26 and the second dummy unit 27 are provided for increasing sensitivity of the touch unit 22 and the fingerprint identification unit 23.

Figure 12:
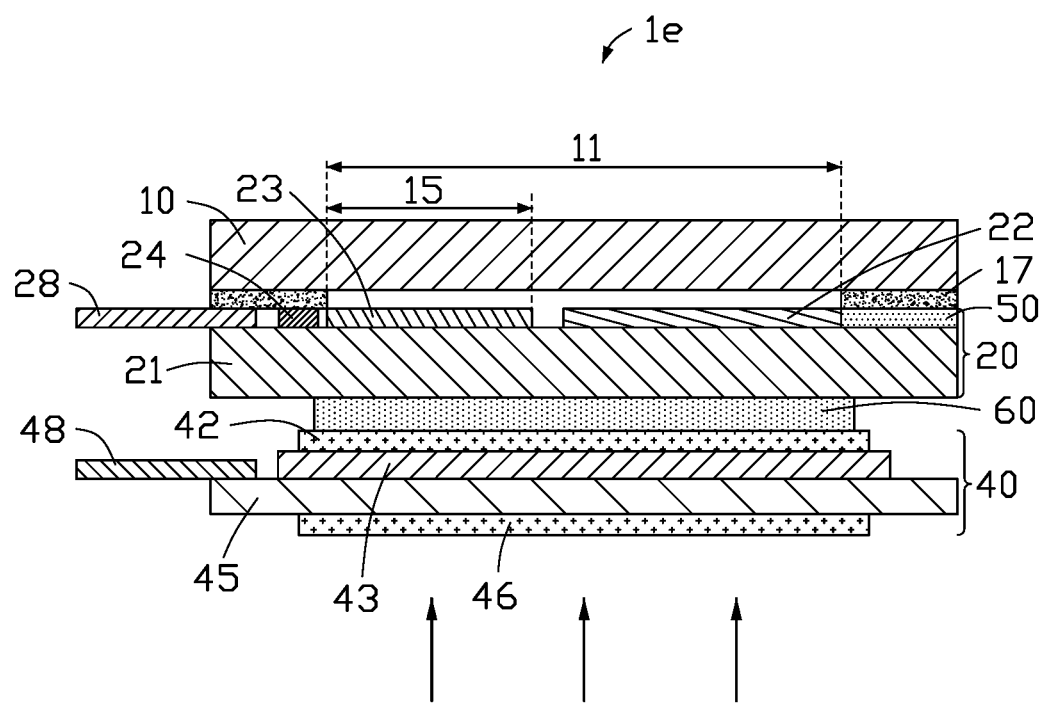
FIG. 12 is a cross-sectional view along line II-II of FIG. 1, the display apparatus being in a fifth embodiment.

FIG. 12 shows a cross-section view of a fifth embodiment of the display apparatus 1E taken along the line II-II. The display region 11 further includes a fingerprint identification region 15. An area of the fingerprint identification region 15 is smaller than an area of the display region 11. In one embodiment, the fingerprint identification region 15 is located on a central bottom of the display region 11. The display apparatus 1E includes a first cover 10, a fingerprint identification module 20, and a display module 40. A sum of thicknesses of the first cover 10 and the fingerprint identification module 20 is 0.7 millimeter (mm).

The first cover 10 and the second cover 30 are made of transparent material sealed against dust and other impurities. In one embodiment, the first cover 10 can be made of, for example, transparent glass, quartz, or plastic. Suitable materials for the transparent substrate comprise, for example, polycarbonate (PC), polythylene terephthalate (PET), polymethylmethacrylate, (PMMA), cyclic olefin copolymer (COC), or polyethersulfone (PES), or combinations thereof. In one embodiment, the first cover 10 is in a first specified thickness. The first specified thickness is 0.175 mm. A shielding layer 17 is located at a surface of the first cover 10 facing the fingerprint identification module 20. The shielding layer 17 is located in the non-display region 15 and is made of opaque material.

The fingerprint identification module 20 is located between the first cover 10 and the display module 40. The fingerprint identification module 20 is pasted on the first cover 10 through a first adhesive layer 50 and is pasted on the display module 40 through a second adhesive layer 60. A thickness of the first adhesive layer 50 is equal to a thickness of the second adhesive layer 60, which is 0.075 mm. In one embodiment, a thickness of the fingerprint identification module 20 is 0.325 mm. The fingerprint identification module 20 includes a first substrate 21, a touch unit 22, a fingerprint identification unit 23, a control unit 24, and a first printed circuit board (PCB) 28. The fingerprint identification unit 23 is further disposed in the fingerprint identification region 15. The touch unit 22 is coplanar with the fingerprint identification unit 23, these are located on a surface of the first substrate 21. The touch unit 22 and the fingerprint identification unit 23 are disposed in the display region 11. The fingerprint identification unit 23 is further disposed in the fingerprint identification region 15.

The first substrate 21 is made of transparent material. In one embodiment, the first substrate 21 can be made of, for example, transparent glass, quartz, or plastic. Suitable materials for the transparent substrate comprise, for example, polycarbonate (PC), polythylene terephthalate (PET), polymethylmethacrylate, (PMMA), cyclic olefin copolymer (COC), or polyethersulfone (PES), or combinations thereof. A thickness of the first substrate 21 is 0.325 mm. The first substrate 21 is disposed between the first cover 10 and the display module 40.

The touch unit 22 is located on the surface of the first substrate 21 facing the first cover 10. The touch unit 22 senses user's touch in the display region 11 of the first cover 10. The touch unit 22 includes a plurality of touch electrodes 221 arranged in a matrix. The touch electrodes 221 are disposed in the display region 11, and surround the fingerprint identification region 15. There is no touch electrode 221 in the fingerprint identification region 15. Each touch electrode 221 is electrically connected with a corresponding first metal conductive line 223 through at least one first hole 224. The first metal conductive line 223 establishes an electronic connection between the touch electrode 221 in the display region 11 and the control unit 24 in the non-display region 13. The first metal conductive line 223 is extended along a first direction Y. The touch electrodes 221 cooperate with each other to form a self-capacitance touch sensing structure. In one embodiment, a length of a side of the touch electrode 221 is in a range between 4 mm and 5 mm. An area of the touch electrode 221 is equal to the area of the fingerprint identification region 15. For example, when a size of the touch electrode 221 is 4 mm*4 mm, a size of the fingerprint identification region 15 is also 4 mm*4 mm.

The fingerprint identification unit 23 in the fingerprint identification region 15 is disposed on the surface of the first substrate 21 facing the first cover 10. The fingerprint identification unit 23 can identify fingerprints applied on the fingerprint identification region 15 of the first cover 10. In one embodiment, the fingerprint identification unit 23 is a capacitance type fingerprint identification sensor and includes a plurality of fingerprint identification electrodes 231 arranged in a matrix. Each fingerprint identification electrode 231 is electrically connected with a corresponding second metal conductive line 234 through at least one second hole 232. The second metal conductive line 234 establishes an electronic connection between the fingerprint identification electrode 231 in the fingerprint identification region 15 and the control unit 24 in the non-display region 13. The second metal conductive line 234 is extended along the first direction Y. In one embodiment, the fingerprint identification electrode 231 is substantially in a square shape. A length of a side of the fingerprint identification electrode 231 is in a range between 50 μm and 60 μm.

The control unit 24 in the non-display region 13 can drive the touch unit 22 and the fingerprint identification unit 23. The control unit 24 is disposed on the first substrate 21.

The first dummy unit 26 is disposed on the surface of the first substrate 21. The first dummy unit 26 includes a plurality of first dummy electrodes 261 arranged in a matrix. The first dummy electrodes 261 and the fingerprint identification electrodes 231 are evenly disposed for uniform light transmittance in the display region 11. The first dummy electrodes 261 are in the display region 11, and at least one first dummy electrode 261 is in the fingerprint identification region 15. The at least one first dummy electrode 261 in the fingerprint identification region 15 surrounds the fingerprint identification electrodes 231. A size of the first dummy electrode 261 is equal to a size of the fingerprint identification electrode 231.

The first PCB 28 in the non-display region 13 is disposed on the first substrate 21 and can establish an electronic connection between the control unit 24 and a motherboard (not shown). In one embodiment, the first PCB 28 can be a flexible printed circuit board.

The display module 40 displays images. The display module 40 is pasted on a surface of the second cover 30 facing away from the first cover 10 through the second adhesive layer 60. The display module 40 includes a first polarizer 42, a color filter 43, a thin film transistor (TFT) substrate 45, and a second polarizer 46, which are overlapped in that order. The display module 40 further includes a second PCB 48. The second PCB 48 is disposed on the TFT substrate 45.

The first polarizer 42 is located between the second cover 30 and the color filter 43. The color filter 43 is located between the first polarizer 42 and the TFT substrate 45. The TFT substrate 45 is located between the color filter 43 and the second polarizer 46. The TFT substrate 45 includes a plurality of TFTs (not shown). The TFT substrate 45 can be made of, for example, transparent glass, quartz, or plastic. Suitable materials for the transparent substrate comprise, for example, polycarbonate (PC), polythylene terephthalate (PET), polymethylmethacrylate, (PMMA), cyclic olefin copolymer (COC), or polyethersulfone (PES), or combinations thereof. The second PCB 48 establishes an electrical connection between the TFT substrate 45 and the motherboard. In one embodiment, the second PCB 48 can be a flexible printed circuit board.

Based on the above recited structure, the fingerprint identification unit 23 is disposed in the display region 11, thus a narrow bezel of the display apparatus 1E is achieved. Further, the first substrate 21 supports the fingerprint identification module 20, thus the structural foundation of the fingerprint identification module 20 is improved, and the fingerprint identification module 20 is less likely to be damaged reduced during a manufacturing process.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A display apparatus with fingerprint identification function comprising:
    a first cover with a display region and a non-display region surrounding the display region; the display region further comprising a fingerprint identification region;
    a display module disposed below the first cover, and configured to display images; and
    a fingerprint identification module disposed between the first cover and the display module;
    wherein the fingerprint identification module comprises a first substrate, a fingerprint identification unit disposed in the fingerprint identification region, a control unit, and a first dummy unit in the display region; the fingerprint identification unit is located on a surface of the first substrate facing the first cover; the fingerprint identification unit identifies fingerprint applied on the fingerprint identification region of the first cover; the first dummy unit is coplanar with the fingerprint identification unit, and is located on the surface of the first substrate facing the first cover; the first dummy unit comprises a plurality of first dummy electrodes arranged in a matrix; the first dummy electrodes surround the fingerprint identification unit, and cooperate with the fingerprint identification unit to form a uniform light transmittance of the display region;
    the fingerprint identification unit comprises a plurality of fingerprint identification electrodes; a size of the fingerprint identification electrode is equal to a size of the first dummy electrode;
    the fingerprint identification unit further comprises a plurality of switch elements; each switch element correspond to one of the fingerprint identification electrodes; each fingerprint identification electrode is electrically connected to the control unit through the corresponding switch element a control terminal of the switch element is electrically connected to the control unit through a first control line, a first connection terminal of the switch element is electrically connected to the control unit through a second control line, and a second connection terminal of the switch is electrically connected to the fingerprint identification electrode.

2. The display apparatus of claim 1, wherein the display apparatus further comprises a second cover disposed between the fingerprint identification module and the display module; the second cover supports the fingerprint identification module; a sum of thicknesses of the first cover, the fingerprint identification module, and the second cover is 0.7 mm.

3. The display apparatus of claim 1, wherein the fingerprint identification electrode is electrically connected with a corresponding second metal conductive line through at least one second hole.

4. A display apparatus with fingerprint identification function comprising:
    a first cover with a display region and a non-display region surrounding the display region; the display region further comprising a fingerprint identification region;
    a display module disposed below the first cover, and configured to display images; and
    a fingerprint identification module disposed between the first cover and the display module;

wherein the fingerprint identification module comprises a first substrate, a fingerprint identification unit disposed in the fingerprint identification region, a control unit, a touch unit, a first dummy unit in the display region, and a second dummy unit in the display region; the fingerprint identification unit is coplanar with the touch unit; the fingerprint identification unit and the touch unit are located on a surface of the first substrate facing the first cover; the fingerprint identification unit identifies fingerprint applied on the fingerprint identification region of the first cover; the first dummy unit is coplanar with the second dummy unit; the first dummy unit and the second dummy unit are disposed upon the fingerprint identification unit and the touch unit; the first dummy unit correspond to the fingerprint identification unit, and the second dummy unit corresponds to the touch unit;

the first dummy unit comprises a plurality of first dummy electrodes arranged in a matrix; the fingerprint identification unit comprises a plurality of fingerprint identification electrodes; a size of the fingerprint identification electrode is equal to a size of the first dummy electrode;

the fingerprint identification unit further comprises a plurality of switch elements; each switch element correspond to one of the fingerprint identification electrodes; each fingerprint identification electrode is electrically connected to the control unit through the corresponding switch element a control terminal of the switch element is electrically connected to the control unit through a first control line, a first connection terminal of the switch element is electrically connected to the control unit through a second control line, and a second connection terminal of the switch is electrically connected to the fingerprint identification electrode.

5. The display apparatus of claim 4, wherein the second dummy unit triggers the fingerprint identification unit to sense fingerprint based on a capacitor coupling function.

6. The display apparatus of claim 4, wherein the touch unit comprises a plurality of touch electrodes arranged in a matrix; a size of the first dummy electrode is equal to a size of the touch electrode; a size of the second dummy electrode is equal to the size of the fingerprint identification electrode.

* * * * *